United States Patent [19]
Lundquist

[11] Patent Number: 5,289,978
[45] Date of Patent: Mar. 1, 1994

[54] APPARATUS FOR CONTINUOUS CONTAINER LABEL REMOVAL

[76] Inventor: Lynn C. Lundquist, 10833 NE. Russell, Portland, Oreg. 97220

[21] Appl. No.: 728,759

[22] Filed: Jul. 8, 1991

[51] Int. Cl.$^5$ ............................................. B02C 13/10
[52] U.S. Cl. ...................... 241/57; 241/64; 241/79.1; 241/247; 241/DIG. 38
[58] Field of Search .................. 241/247, 261, 57, 62, 241/64, 41, 79.1, 259.1, 14, 248, DIG. 38, 245

[56] References Cited

U.S. PATENT DOCUMENTS

| | | | |
|---|---|---|---|
| 2,092,992 | 9/1937 | Thalman | 241/82.4 |
| 2,561,043 | 7/1951 | Ayers | 241/245 |
| 2,797,052 | 6/1957 | Clark | 241/190 |
| 2,879,005 | 3/1959 | Jarvis | 241/79.1 |
| 3,011,220 | 12/1961 | Keller et al. | 241/41 |
| 3,810,584 | 5/1974 | Kahmann | 241/37 |
| 3,833,178 | 9/1974 | Beck | 241/3 |
| 4,000,031 | 12/1976 | Acobas | 162/4 |
| 4,033,804 | 7/1977 | Baldyga | 156/84 |
| 4,059,237 | 11/1977 | Mannstrom | 241/246 |
| 4,261,522 | 4/1981 | Lyons | 241/246 |
| 4,314,674 | 2/1982 | Cerroni | 241/14 |
| 4,379,525 | 4/1983 | Nowicki et al. | 291/20 |
| 4,445,973 | 5/1984 | Bystedt | 162/261 |
| 4,673,134 | 6/1987 | Barthelmess | 241/57 |
| 4,728,045 | 3/1988 | Tomaszek | 241/19 |
| 4,830,188 | 5/1989 | Hannigan et al. | 209/3 |
| 4,905,918 | 3/1990 | Selles et al. | 241/39 |
| 5,011,087 | 4/1991 | Richardson et al. | 241/5 |
| 5,011,088 | 4/1991 | Savonjousi | 241/21 |
| 5,110,055 | 5/1992 | Teeny | 241/15 |

FOREIGN PATENT DOCUMENTS

| | | | |
|---|---|---|---|
| 1005899 | 3/1983 | U.S.S.R. | 241/261 |
| 1243651 | 7/1986 | U.S.S.R. | 241/261 |
| 1351661 | 11/1987 | U.S.S.R. | 241/79.1 |

*Primary Examiner*—Timothy V. Eley
*Assistant Examiner*—John M. Husar

[57] ABSTRACT

This apparatus is a continuous processing device designed to remove labels and similar contaminants from granulated material prior to its reclamation into a manufactured product. The apparatus is particularly suited to the removal of adhesive backed product labels affixed to plastic base materials subsequent to granulation of the intact plastic item. This allows reprocessing of label-contaminated plastic containers into plastic pellets with greater economy and a higher purity of the end product. The need for this process is particularly acute with blow molded plastic containers which have paper or plastic labels affixed to large areas of their surface. Because this apparatus is continuous in operation, it can be placed in line with other automatic processing equipment such as granulators, washers, classifiers, and extruders. The success of this apparatus results from a combination of physical and thermal forces generated within the equipment which remove the adhesive from the plastic base. A further air classification process removes the waste fiber or adhesive products from the salvageable granulated material.

10 Claims, 2 Drawing Sheets

APPARATUS FOR CONTINUOUS CONTAINER LABEL REMOVAL

BACKGROUND

1. Field of the Invention

This apparatus provides a mechanism for continuously removing labels and similar contaminants from granulated material prior to its reclamation into a manufactured product. Primarily, the apparatus is used to remove adhesive backed product labels from granulated plastic containers prior to their reprocessing into plastic pellets. The need for this process is particularly acute with blow molded plastic containers which have paper and plastic labels affixed to large areas of their surface.

Because this apparatus is continuous in operation, it can be placed in line with other automatic processing equipment such as granulators, washers, classifiers, dryers, and extruders.

2. Description of the Prior Art

Within present plastic material reclamation technology, much attention is being given to the needs of increasing the quality of the end product. Removing contamination from the material prior to pelletizing in an extruder is now recognized as a mandatory step in this direction. A significant step in contamination elimination is the removal of product labels and the accompanying adhesive from blow molded containers.

To date, most processes specializing in fiber removal from granulated plastic have used one of two technologies. In some cases, separation is done directly after granulation with air classification systems where the granulated material falls through a labyrinth with a counter air flow which entrains the light materials. (See references to air classification in Tomaszek, U.S. Pat. No. 4,728,045.) Though this will effectively remove fibrous materials which are physically separated from the plastic granules, it can do nothing with the label material yet affixed to the plastic base.

A second, and most commonly used process, involves baths of aqueous solutions in which the label contaminated material is either soaked or agitated at high energy levels. Most notable among these processes are those by Hannigan et al. (U.S. Pat. No. 4,830,188), Nowicki et al. (U.S. Pat. No. 4,379,525), and Beck (U.S. Pat. No. 3,833,178). Though effective in removing labels from granulated plastic containers, these methods often result in complex batching apparatus and a high degree of complexity in clean-up to avoid cross-contamination in subsequent batches.

Other label removal technics have also been used. In one technology heat is used to deform the container prior to further label removal. (Refer to Baldyga, U.S. Pat. No. 4,033,804.) These processes consume relatively high input levels of energy in the form of radiant heat. They will also require additional separation methods as noted above.

A final process addressing the need to further remove the label and adhesive material is a batch process which subjects the material to repeated impact from rotating members. Though effective, these attempts are batch processes and lack the advantages of a continuous process. In general, batch methods are less adaptable to the requirements of other continuous production technologies, and often involve more complex and costly equipment.

The technology of this invention is a significant advancement over the prior art in that it has achieved an effective apparatus for removing adhesive and label contaminants from granulated plastic containers. Further, it has achieved this end with a continuous process.

OBJECTIVES OF THE INVENTION

This invention was developed with an understanding of the limitations of the present methodology used to separate labels, adhesives, and other contaminants from granulated materials prior to final reprocessing. In particular, this is the case encountered while cleaning blow molded plastic containers contaminated with either fiber (paper) or plastic labels which are affixed to the container with adhesives. Furthermore, it was designed with a number of specific objectives considering its potential application.

1. It is the general objective of this invention to provide an apparatus with sufficient processing capacity for continuously removing product labels, adhesives, and similar contaminants from reclaimable granulated materials within a plastic or other material reprocessing plant.

2. Another objective of this invention is to provide a single processing apparatus which will both dislodge contaminants from the granulated material and will subsequently separate these loose contaminants from the salvageable material in a single pass through the equipment.

3. Another objective of this invention is to provide a processing apparatus which facilitates the changeover from a first granulated material to a second granulated material without cross contamination of the two materials in the subsequent discharge of the second material.

4. Another objective of this invention is to provide an apparatus with fully controllable feed and process rates so that the through-put can be adjusted to the requirements of processing the granulated material and other processing apparatus in the same production line.

5. Another objective of this invention is to provide ready access to the process sub-section for inspection, maintenance, and cleaning.

6. A final objective of this invention is to effect product label removal without the use of liquid baths or submerged processes.

These and other objectives and advantages of the present invention, and the manner in which they are achieved, will become apparent in the following specifications and claims.

SUMMARY OF THE INVENTION

This apparatus is a continuous processing device designed to remove contamination from granulated materials prior to final reprocessing. Specifically, the apparatus is designed to remove product labels affixed to plastic base materials subsequent to granulation of the intact plastic item. Such is primarily the case with blow molded plastic containers having printed paper, plastic, or other fibrous material product labels. It is a multiple stage, rotary impacting device which imparts impact and thermal energy to the granulated material within the main processing sub-section. It further uses a feed and a discharge screw conveyor to transport the granulated material both to, and from, the main processing sub-section.

DESCRIPTION OF THE PREFERRED EMBODIMENTS

Figure 1:
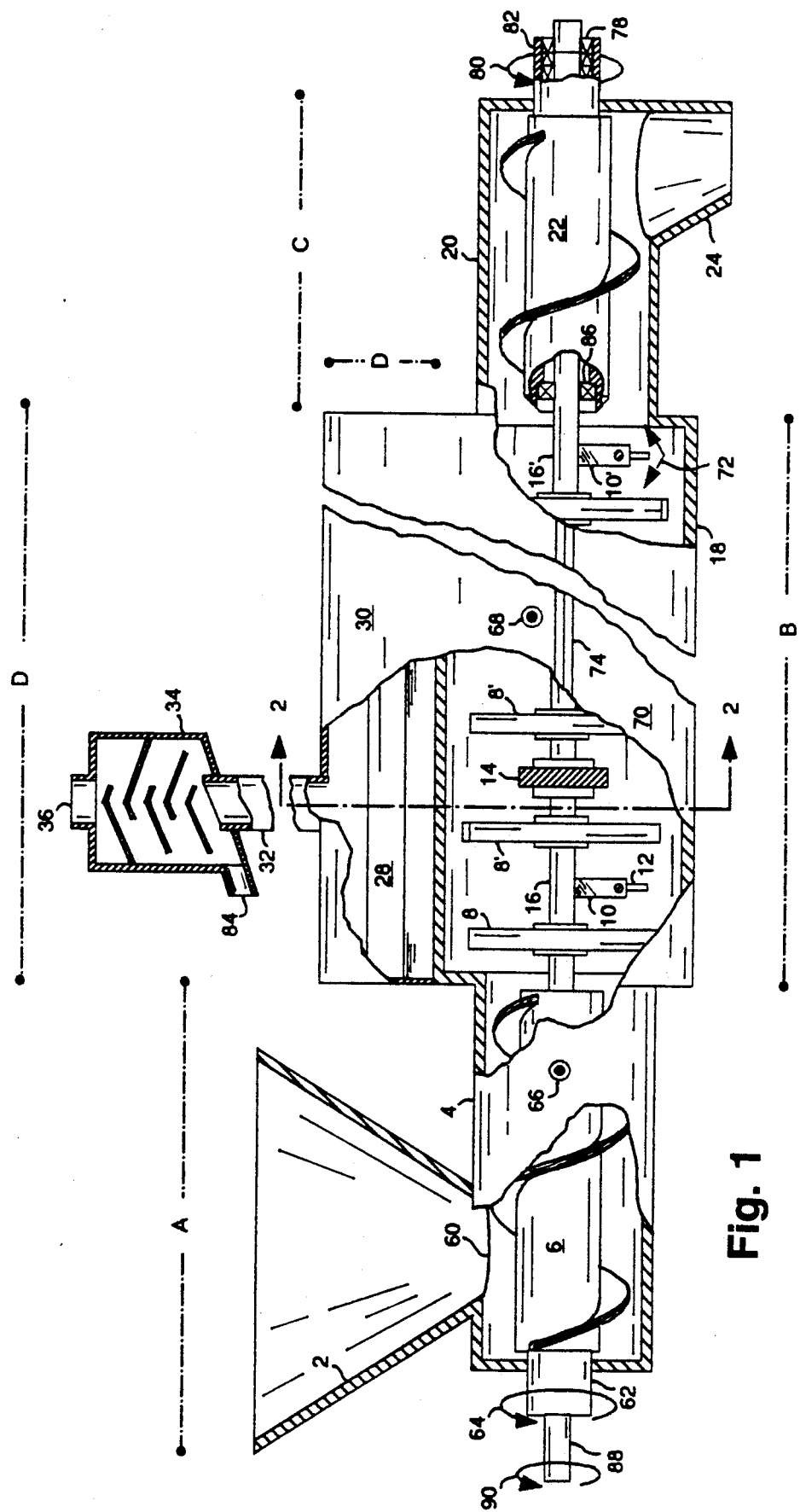
FIG. 1 is a sectional view with a partial cut-away section of the complete apparatus.

To simplify the description, symmetrical parts, or portions of a single part where divided by a sectional view, will be designated with a prime ('). The description of the part(s) having primed reference characters will be limited.

Referring now to FIG. 1, it can be seen that the continuous label decontamination apparatus consists of four sub-sections:

The feed sub-section A consists of the feed hopper 2, a feed auger housing 4, and the feed auger 6.

The process sub-section B consists of at least one rotating member 8 in cooperation with at least one stationary member 10. Said stationary member is further equipped with an adjustable deflection tab 12 which allows the process rate through the apparatus to be controlled. A stationary bearing member 14 may be used to support the central shaft 16. The process sub-section B is contained within the process housing 18.

The discharge sub-section C consists of a discharge auger housing 20, a discharge auger 22, and a discharge chute 24.

The air classifying sub-section D consists of air injection equipment in the process sub-section B (which will be shown in FIG. 2), a series of classifier baffles 28 (which will be shown in further detail in FIG. 2) in the main baffle box 30. Upon exiting said main baffle box through the air discharge duct 32, the air flows through an upper baffle box 34 before final discharge at 36.

Figure 2:
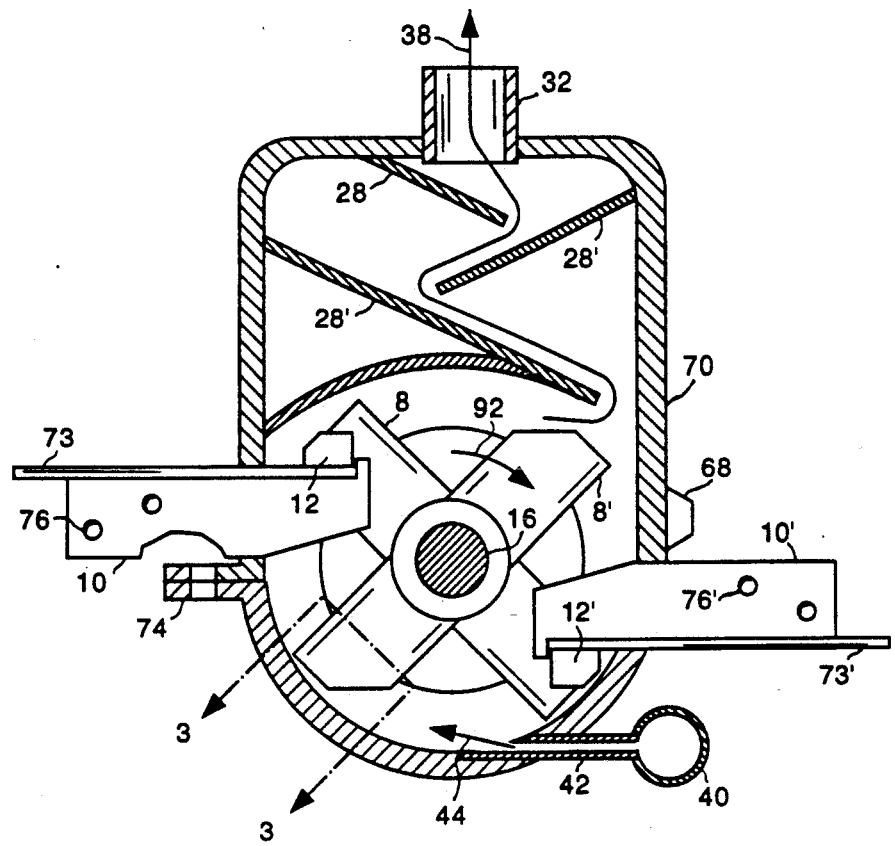
FIG. 2 is an end view of the apparatus along line 2—2 of FIG. 1.

Referring now to FIG. 2, a more complete view of the rotating member 8 and stationary member 10 is visible. Whenever more than a single rotating member 8 is mounted on the central shaft 16, it is axially rotated from approximately twenty to not more than ninety degrees from the mounting plane of the proceeding rotating member as indicated by the relative positions of rotating members 8 and 8'. Said rotating members cooperate with a pair of opposing stationary members 10 and 10' mounted in the same plane relative to the axis of the central shaft 16.

The classifier baffles 28 are affixed in such a way that a forced air path 38 is a vertical labyrinth. The forced air is introduced into an air manifold 40 from a high volume blower (not shown). From the air manifold 40 the pressurized air is conveyed to a series of air injectors 42 which inject a high volume air source 44 into the process. The blower, air manifold and air injectors are referred to herein as air injection equipment.

Figure 3:
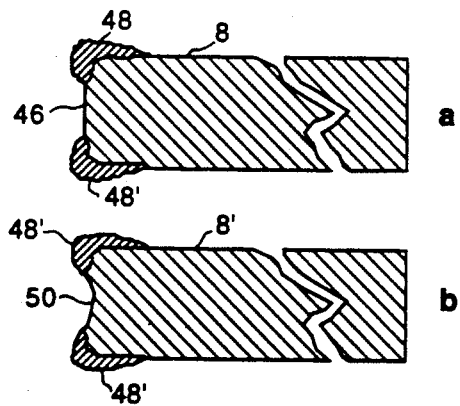
FIG. 3 is a sectional view of the rotating member along line 3—3 of FIG. 2.

In FIG. 3a a sectional view of a hard surfaced rotating member leading edge 46 is shown. A welded, hard-surfacing agent 48 is deposited along the length of the leading edge 46. As the rotating member 8 is abraded by the granulated process material, a wear pattern develops such as is displayed in FIG. 3b. Inasmuch as the hard-surfacing agent 48 has a higher resistance to abrasion than the base material of the rotating member 8, a concave leading edge 50 is produced on said rotating member which has been in service.

Figure 4:
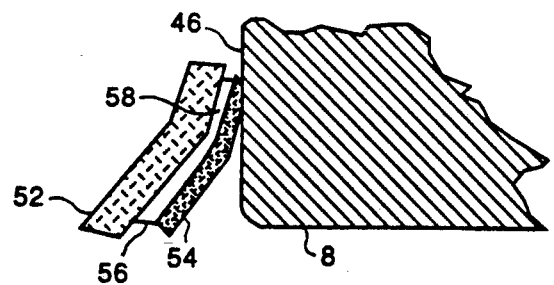
FIG. 4 is a sectional view of the rotating member interacting with a piece of contaminated granulated material.

In reference to FIG. 4, a plastic granulate 52 is shown interacting with the leading edge 46 of the rotating member 8. The plastic granulated material 52 retains a portion of label material 54 affixed with an adhesive 56.

OPERATION

This apparatus is a continuous processing device designed to remove contamination from granulated materials prior to final reprocessing. Specifically, the apparatus is designed to remove product labels affixed to plastic base materials subsequent to granulation of the intact plastic item. Such is primarily the case with blow molded plastic containers having printed paper, plastic, or other fibrous material product labels.

The success of this device is dependent on a combination of physical and thermal forces generated within the process sub-section B. Initially, the granulate material 52 is subjected to high impact forces as it tumbles between a high speed rotating member 8 and two cooperating stationary members 10. In part, these high impact forces flail the label material 54 which weakens the bonding qualities of the adhesive 56, and breaks said label material into fibers (in the case of paper labels) or thin film (in the case of plastic or metalized labels).

Of equal importance, however, are certain thermal forces which are taking place in the adhesive layer 56. Energy released from a water induced thermal action removes the adhesive 56 (accompanied by substantial amounts of label material 54) from the plastic granulated material 52. This physical and thermal action is repeated with great frequency as the plastic granulated material 52 moves through multiple stages consisting of a high speed rotating member 8 cooperating with two stationary members 10.

(It should be noted that this apparatus does not employ a wash process. That is, a small amount of moisture is used to achieve the action which removes the adhesive. However, a larger amount of water, as would be found in a wash process, would prevent the required thermal action. In some cases, the apparatus may be used as a dry process in which the impacting action in conjunction with air classification is sufficient to remove a surface contaminant from the granulated material 52.)

Subsequent to the removal of the label material 54 (which is most commonly a fiber) and its companion adhesive 56, these lighter materials are entrained by the counter-flowing air classification current and separated from the salvageable plastic granulated material 52. This is achieved by introducing a high volume air source 44 into the process sub-section B through a series of air injectors 42. As the air flows through the process it entrains the lighter contaminant materials, carrying them out of the process sub-section B. As will be shown in following paragraphs, further provision is made to separate plastic granulated materials 52 from the discharge air flow with two classifying systems.

With the brief operational description given in the previous paragraphs, it is now possible to more fully explain the precise components involved in this apparatus.

Contaminated granulated material 52 is fed into the feed hopper 2, passing through the feed hopper throat 60 into the feed auger housing 4. By means of a rotating feed auger 6, said granulated material is conveyed to the process sub-section B. The feed auger 6 is rotated by means of a variable speed drive (not shown) coupled to the feed auger drive hub 62. Said feed auger drive hub rotates as indicated by arrow 64 in such a direction that said granulated material is carried through the feed sub-section A to the process sub-section B.

Small quantities of water are added to the granulated material 52 when the adhesive 56 or label material 54 is dry. At least one water spray nozzle 66 may be incorporated into the feed sub-section A for this purpose.

Within the process sub-section B of the apparatus, the granulated material 52 passes through a series of rotating members 8 and their cooperating stationary members 10. A stationary member set (comprised of 10 and 10') are so located that the loading on the rotating member 8 is symmetrical. That is, the leading edge 46 of the rotating member 8 on each radial portion extending outward from the shaft 16 loads against a stationary member 10 at substantially the same instant. Successive rotating members 8, however, are axially mounted at some angle not exceeding a right angle to each other so that the instantaneous loading on the drive mechanism is reduced.

Within the process sub-section B the high speed central shaft 16 may be supported by one or more stationary bearing members 14. Said stationary bearing member serves the dual function of providing a rigid bearing support while at the same time serving the function of other stationary member 10 units.

Water mist may be injected into the process sub-section B through a plurality of water spray nozzles 68 located on the process sub-section housing 70. The amount of water injected and the particular locations of injection will vary with the needs of the granulated material being processed.

The process dwell time and holding quantity is achieved in two ways. First, the feed rates of the feed auger 6 and the discharge auger 22 are independently controlled. Various speed ratio combinations are possible which vary the quantity of material held in the process sub-section B. Operating the feed auger 6 at a slightly higher feed rate than the discharge auger 22 removes material will cram-feed the process sub-section B and increase dwell time. Reversing the speed ratio between the said augers so that the rotational speed of discharge auger 22 exceeds that of the feed auger 6 will starve-feed the process sub-section B and reduce the dwell time.

Secondly, each stationary member adjustable deflection tab 12 is independently varied as indicated by 72 to adjust the rate of forward movement of the granulated material in the process sub-section B. Greater turbulence of the granulated material can also be achieved by individually adjusting the deflection tabs 12 within each stage of the process sub-section B. In some cases, said deflection tab for a given stage may be set for negative forward material travel. The deflection tab 12 is externally manipulated by means of the deflection tab control rod 73, which extends to a locking control handle (not shown).

For maintenance and cleaning functions it is necessary that the high speed shaft 16 and related assemblies be readily accessible. This is achieved with a split case as indicated by the case flange 74. Ease of access may be further enhanced by providing a hinge area (not shown) on one of the two flanged areas. The stationary member 10, is secured with fasteners to an outer structure (not shown) by means of appropriately located mounting holes 76.

The discharge auger 22 is shown with cut-away sections showing the forward discharge auger carrier bearing 86 and the high speed shaft carrier bearing assembly 78. A forward discharge auger carrier bearing 86 carries the discharge auger 22 on the high speed shaft 16. (A similar bearing arrangement (not shown) is found in the feed auger 6.) Arrow 80 indicates the normal direction of rotation of the discharge auger 22. The discharge auger 22 is rotated by means of a variable speed drive (not shown) coupled to the discharge auger drive hub 82. The discharge auger drive hub 82 rotates in such a direction that the granulate material 52 is carried from the discharge sub-section C to the discharge chute 24.

The high speed shaft 16 is driven at 88 in a direction of rotation as indicated by arrow 90.

The air classifying sub-section D consists of an air injection system and related labyrinth systems. The air injection system is comprised of a high volume air blower (not shown) which supplies the air manifold system 40. Air is injected tangentially into the process at 44, as shown by arrow 92 indicating the direction of rotation of the shaft 16 and rotating members 8. As the air migrates through the process, it entrains air-borne fiber and adhesive particles. Inasmuch as a high volume and velocity air supply is employed, some inadvertent entrainment of granulated material 52 will ensue. Thus, a series of classifier baffles 28 are positioned so that the forced air path 38 will divest itself of said granulated material, dropping it back into the process sub-section B against the flow of the forced air path 38.

Some salvageable granulated material will remain in the forced air path 38 as it exits the air discharge duct 32. A final upper baffle box 34 is mounted above the apparatus which will finally separate the salvageable granulated material and the air-borne contaminants. The air-borne contaminants are carried out at the final discharge 36, while the salvageable granulated material is discharged at 84 to an air lock and conveying system (not shown) which returns the material to the feed hopper 2.

In practice, it is desirable to maintain the air pressure within the process sub-section B substantially equal to that of the ambient air pressure wherein the apparatus is employed. An air pressure with significant deviation from ambient, would cause an air flow past both the feed auger 6 and the discharge auger 22 which would entrain granulated material. Unregulated granular material movement would impede the control of the granulated material in either auger section. In practice, it is therefore desirable to provide a push-pull air system to the process sub-section B. This is accomplished with a pressurized air supply directly coupled to the air manifold 40 and an air evacuation pump (not shown) at the final discharge area at 36. In this way, air movement in the process sub-section B is maintained at high velocity without a substantially higher pressure than ambient.

While the present invention has been described in conjunction with a single embodiment, it is to be understood that various modifications and other embodiments of the present invention may be made without departing from the scope of the invention as described herein and as claimed in the appended claims.

The embodiments of the invention in which an exclusive property or privilege is claimed are defined below.

What I claim is:

1. A substantially continuous granulated material processing apparatus in which adhesive and affixed product labels are removed from granulated plastic container material wherein continuous defines an apparatus whereby said apparatus progressively effects the processing action in the absence of holding or batching stages, said continuous granulated material processing apparatus comprising:

a) a rotating central shaft with substantially a horizontal orientation;

b) at least two rotating members axially attached to said rotating shaft;

c) each of said rotating members cooperating with at least two stationary members mounted on the same plane relative to each other when perpendicular to said rotating central shaft, and in a same axial plane with said rotating members whereby an impacting force is imparted to said granulated material unto which is affixed said product label;

d) an air classification means employing an air injection mechanism consisting of a mechanical air supply, and at least one air injector cooperating with a labyrinth exit path and an air exit opening, said labyrinth exit path substantially distinct from the exit path of said granulated material, all of which is incorporated into the processing section wherein at least two of said rotating members and at least four of said stationary members are located; and, e) wherein the rate of movement of said granulated container material being processed is controlled within the process area while maintaining said rotating central shaft at a constant rate of rotational speed so as to determine the length of time said granulated container material is subject to the forces of at least two of said rotating members in cooperation with at least four of said stationary members.

2. The granulated material processing mechanism of claim 1 further including at least one stationary member which incorporates a central shaft anti-friction bearing.

3. The granulated material processing mechanism of claim 1 further including an air injection mechanism consisting of a mechanical air supply, an air manifold, and at least one air injector whereby air is injected into the material process.

4. The granulated material processing mechanism of claim 1 further including a classifying forced air flow consisting of a push-and-pull arrangement wherein a pressurized air supply is introduced into the process at a bottom entry point and a vacuum air pump is provided at the exit source above the process wherein the air flow within said process area has high velocity yet does not differ substantially from the ambient air pressure.

5. The granulated material processing mechanism of claim 1 further including a first classifier baffle section immediately adjacent and affixed to the process sub-section wherein air-borne contaminants are separated from said granulated process material.

6. The granulated material processing mechanism of claim 1 further including a second classifier baffle box within the exhaust air discharge duct wherein extraneous granulated process material is separated from air-borne contaminants and is redirected to said feed hopper area.

7. The granulated material processing mechanism of claim 1 further including at least one adjustable deflection tab affixed to said stationary member wherewith the rate of material flow through said material processing mechanism is controlled.

8. The granulated material processing mechanism of claim 1 wherein said rotating member is configured with a hard surface weld deposit on the leading edge whereby said leading edge of said rotating member maintains a concave frontal surface.

9. The granulated material processing mechanism of claim 1 further including a removable portion of said process sub-section wherein the shaft assembly is readily exposed for maintenance and cleaning.

10. The granulated material processing mechanism of claim 1 further including at least one water spray nozzle whereby water is injected into said granulated material process.

* * * * *